COLOR TELEVISION RECEIVER UTILIZING A MODIFIED LUMINANCE SIGNAL

Filed Nov. 7, 1966 3 Sheets-Sheet 1

Inventor
John L. Rennick
By Francis W. Crotty
Attorney

Inventor
John L. Rennick
By Francis W. Crotty
Attorney

Inventor
John L. Rennick
By Francis W. Crotty
Attorney

United States Patent Office 3,470,312
Patented Sept. 30, 1969

3,470,312

COLOR TELEVISION RECEIVER UTILIZING A MODIFIED LUMINANCE SIGNAL

John L. Rennick, Elmwood Park, Ill., assignor to Zenith Radio Corporation, Chicago, Ill., a corporation of Delaware Filed Nov. 7, 1966, Ser. No. 592,566
Int. Cl. H04n 5/38, 5/44
U.S. Cl. 178—5.4 11 Claims

ABSTRACT OF THE DISCLOSURE

This specification discloses a color television receiver which utilizes nonstandard color-difference signals and a modified luminance signal to display the color image in order to equalize the demand on the syncronous detectors. The color-difference signals (R–M, G–M, and B–M) are obtained by synchronously detecting the chroma signal with respect to a nonstandard reference phase. The modified luminance signal (M) is derived from the NTSC luminance signal (Y) in accordance with the color-difference signals.

The present invention is directed generally to a color receiving apparatus and concerns most particularly the processing of the luminance and chrominance signals of a color television broadcast.

It is well understood that color transmission in accordance with NTSC standards adopted by the Federal Communications Commission has a luminance signal representing brightness information of an image being transmitted and, additionally, a chrominance signal in the form of a complex modulated subcarrier having phase and amplitude modulation which respectively represent the hue and saturation information of that image. The chrominance signal may be variously demodulated in order to derive color control signals which, in conjunction with the luminance or Y signal, are necessary for controlling the currently popular three gun shadow mask type of color tube. Usually, the chrominance signal is detected in order to develop what are referred to as color difference signals designated R–Y, G–Y and B–Y for application to the grids while luminance signal Y is applied to the cathodes of the three guns in such a tube. Internal matrixing within the tube results in control of the electron beams in accordance with primary color signals R, B and G, where R, B and G denote red, blue and green, respectively.

It is, of course, known that each of the color difference signals may be derived directly by detection of the chrominance signal at the appropriate phase angles but it is not necessary to employ three detectors. Since the luminance signal has weighted contributions of all three primary color signals, one may detect a pair of color difference signals and develop the third by a matrixing process. Indeed, an active matrix circuit for accomplishing this result is specifically described and claimed in applicant's Patent 3,180,928 issued April 27, 1965, and assigned to the assignee of the present invention. The receiver processing apparatus to be described herein represents a further extension of the development to which the earlier patent is directed but with particular emphasis on avoiding criticality in any portion of the color signal processing stages of the receiver and at the same time with special regard to apparatus that lends itself uniquely well to microelectronics of the monolithic and thin or thick film varieties.

Another distinct advantage realized with the apparatus to be described is a more equal demand of the drive required of the color difference signal developing circuitry than obtainable with receiving apparatus currently in commercial use. It may be demonstrated that the gain requirements of the B–Y detector in such receivers, for example, are very much more severe than the requirements of the G–Y or even the R–Y detector. One previous approach to more nearly equalize the gain requirements of the detectors is described in Patent 2,923,767-Altes issued Feb. 2, 1960. The receiver of that patent employs a pair of color difference detectors and a matrix for deriving the third color difference signal. By assigning unusual detection angles to the detectors, requiring critical adjustment of the relative phases of the demodulation signals supplied to the detectors, the patentee is able to derive modified color difference signals, modified by the elimination of common mode components but attaining this desired result at a cost of criticality in relative phase angles. The present development avoids such criticality and has the further desirable advantage of simplicity and symmetry in the signal processing structure.

Accordingly, it is an object of the invention to provide a new and improved receiving apparatus for processing the luminance and chrominance signals of a color broadcast.

It is a particular object of the invention to provide such an apparatus characterized by freedom of critical adjustment.

It is another specific object of the invention to provide such a processing apparatus which lends itself most attractively to the techniques of micro-circuitry.

A color television receiving apparatus embodying the invention is designed to process a luminance signal representing brightness information of an image and a chrominance signal in the form of a subcarrier which has been phase and amplitude modulated with hue and saturation information, respectively, of that image. The apparatus in one form comprises a symmetrical three phase detection system having three synchronous detectors with individual output load impedances. There are means for applying the chrominance signal to each of these detectors and other means for applying to each of the detectors an assigned one of three demodulation signals, phase synchronized to the chrominance signal but having a mutual phase displacement of 120°, to detect three color difference signals. A matrixing network is provided and includes three transistors coupled to the output load impedances of the synchronous detectors, respectively. The transistors have a common emitter impedance but have individual output load impedances for developing three modified color difference signals corresponding to the first mentioned color difference signals but free of their common mode components. Finally, there are means for deriving from the chrominance signal a correction signal and for matrixing it with the luminance signal to develop a modified luminance signal for combining with the modified color difference signals to produce three primary color signals.

In another form of the invention, the apparatus uses but two detectors in the demodulation system to which demodulation signals are supplied in phase quadrature in order to derive a pair of color difference signals. In this modification, the matrix network develops the required third color difference signal in addition to deleting the common mode information and providing the correcting signal for matrixing with the luminance signal.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 6:
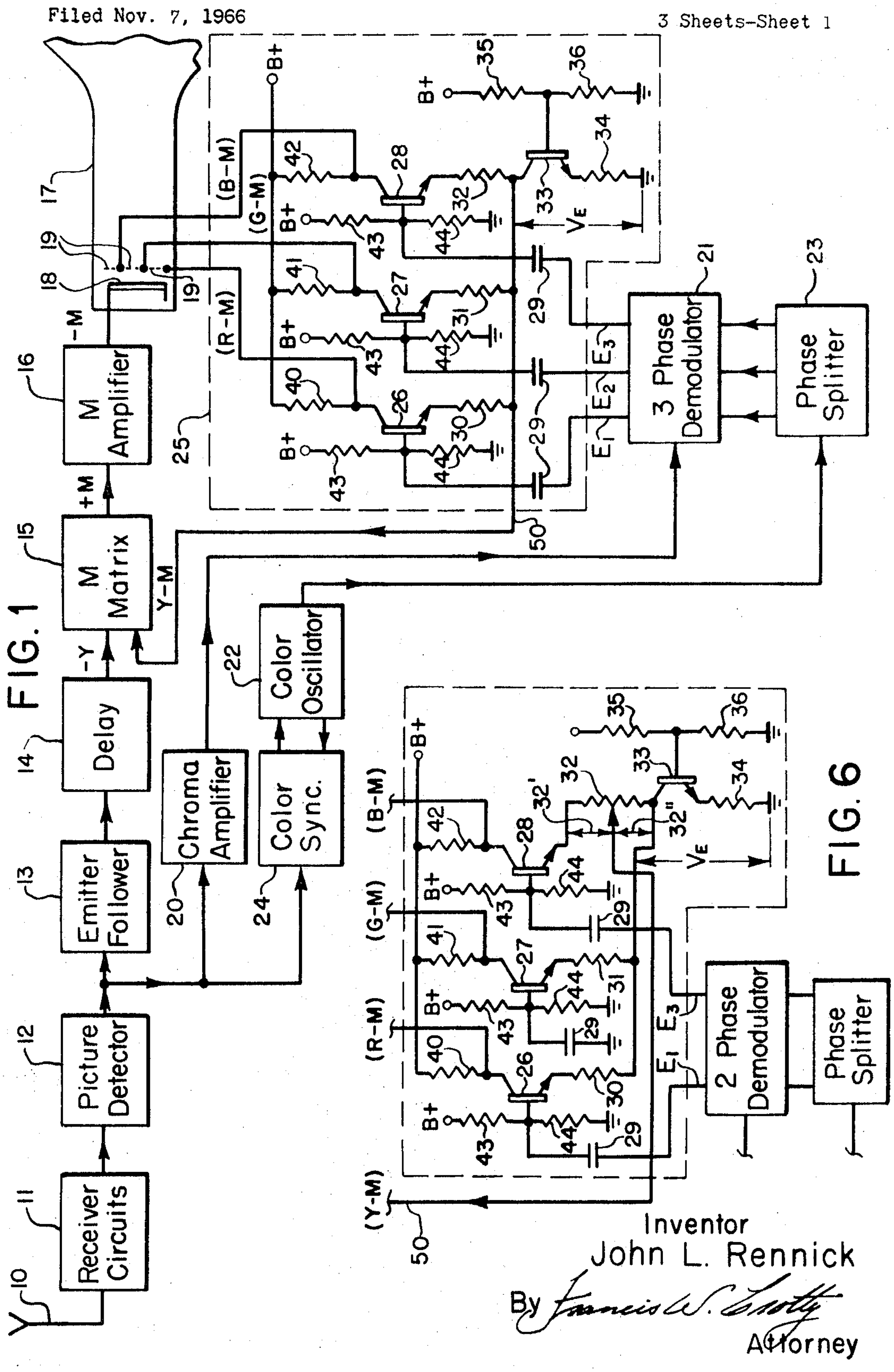
FIGURE 1 is a schematic circuit diagram of a color television receiver embodying the present invention in one form.
FIGURES 5 and 6 are the modified forms of the invention to which these diagrams apply, respectively.

Referring now more particularly to FIGURE 1, the color television receiving apparatus there represented is intended to process a color program signal in accordance with the NTSC specifications. As explained, this signal is in the form of a luminance signal representing brightness information of an image and a chrominance signal which is a subcarrier phase and amplitude modulated with hue and saturation information of that same image. Obviously, there is also an audio signal but it is of no particular concern to the apparatus to which the invention is directed.

The program signal is intercepted by an antenna 10 and delivered to the receiving circuits of the receiver represented by the block 11. This portion of the receiver includes those stages which precede the picture detector and which in themselves constitute no claim of the present invention. They include, for example, a tunable selector and local oscillator which are uni-controlled to permit the instrument to select any desired channel in either of the VHF or UHF spectrums. The selected channel signal is converted to the intermediate frequency of the receiver and after intermediate frequency amplification is applied to the picture detector 12 where the luminance and chrominance signals are derived for application to the processing stages of the receiver presently to be described in more detail and to which the subject invention is addressed.

Of course, the receiver will have the usual sweep and high voltage systems for developing the deflection signals and the operating potentials required for the picture tube. The synchronizing information of the received signal controls the scanning systems to function in properly timed relation to the signal deriving equipment of the transmitter. There is also an automatic gain control employed to maintain a substantially constant intensity of the signal input to the picture detector and there may also be an automatic frequency control for maintaining precise adjustment of the heterodyning oscillator. Finally, the usual receiver has a sound system energized by the audio portion of the received broadcast but none of these arrangements, necessary as they may be to the operative receiver, need be considered in more detail in explaining the present invention.

At the output of the picture detector, the signal processing stages are arranged effectively in two channels, one being devoted primarily to luminance and the other to chrominance. The luminance channel, as shown, comprises an emitter follower 13 which receives the demodulated signal from picture detector 12 and applies it through a delay network 14 to an M matrix 15. This matrix concurrently receives a correcting signal to be discussed more specifically hereafter to deliver an output signal through an amplifier 16 to the cathodes 18 of a three-gun shadow mask type picture tube 17. Delay line 14 is properly terminated and is used for equalizing signal translation through the chrominance and luminance channels. The convergence circuitry customarily associated with the color tube is entirely conventional and, for simplicity, has been omitted from the drawing.

The chroma channel includes a frequency selective amplifier 20 which accepts only the chrominance signal of the received program for application to a demodulation system 21. Preferably, the demodulator, for the embodiment under consideration, is a symmetrical three-phase detection system having three transistor type synchronous detectors with individual output load impedances. The chrominance signal obtained from amplifier 20 is applied simultaneously to all three detectors of modulator 21.

The three detectors may, in effect, be keyed to sample the chroma signal at appropriate phases and, in accordance with the invention, this is accomplished by means for applying to each of the detectors an assigned one of three demodulation signals, phase synchronized to the chroma signal but having a mutual phase displacement of 120°, so that three color difference signals may be detected. These outputs of the demodulator are designated $E_1$, $E_2$ and $E_3$ in FIGURE 1. The demodulation signals are derived from a color oscillator 22 which produces a signal of sinusoidal waveform and a frequency corresponding to the fundamental frequency of the chroma carrier. It is phase synchronized to color burst information contained in the program signal by means of the usual AFC or color synchronizing unit 24 which receives the color bursts of the received signal as well as an output from reference oscillator 22 to compare their phase and develop a correction voltage, if necessary, to establish and maintain a condition of phase lock. Generally, the color synchronizing arrangement is gated to respond only to the color burst information of the program signal but here again this portion of the receiver is entirely conventional in design and operation. The output of the reference oscillator is delivered to a phase-splitting network 23 arranged to supply three outputs which have a mutual phase displacement of 120°. A variety of circuit arrangements may be utilized for this purpose including, for example, a delay line of appropriate electrical length and tapped as required to achieve signals of the proper relative phase. Any conventional source may be employed to accomplish the functions assigned to reference oscillator 22 and phase splitter 23.

Following demodulator 21 is a matrix network 25 that is basically the same as the matrix network of the above-identified Rennick patent. It includes three amplifiers having input circuits respectively coupled to the load impedances of the three detectors in demodulation system 21 and having output circuits including an impedance that is common to the input and output circuits of all three amplifiers. More specifically, in the preferred embodiment, transistor amplifiers 26, 27 and 28 are employed. The base electrodes couple through coupling capacitors 29 to the load circuits of the three detectors constituting demodulator 21. Each amplifier has an individual emitter resistor 30, 31, and 32 and they share a common emitter impedance in the form of still another transistor 33. The collector of transistor 33 connects to the common junction of emitter loads 30–32 while the emitter of transistor 33 connects to ground through an emitter resistor 34. The base of this transistor connects to a biasing network coupled between a potential source B+ and a plane of reference potential shown as ground. The biasing network includes resistors 35 and 36. Each of transistor amplifiers 26–28 has an individual output load impedance shown as collector resistors 40–42 for developing signals which correspond to the three-color difference signals derived in demodulator 21 but free of their common mode components and thus delineated "modified color difference signals." For convenience, they are labeled R–M, B–M and G–M in FIGURE 1. Finally, each of the transistor amplifiers has a biasing network of resistors 43, 44 and a potential source B+. Where the arrangement is to be constructed as an integrated circuit, it is desirable that load resistors 40–42 be equal and that the biasing networks of the several transistors be identical to facilitate the circuit processing. It is necessary, however, to individualize the separate emitter loads 30–32 in a manner to be made clear hereafter.

Output connections extend from the collector electrodes of the amplifiers in matrix 25 to the input grids 19 of the color tube 17 and the modified color difference signals are thus applied to those grids. It is contemplated that internal matrixing take place within the picture tube so that the several beams thereof are, in fact, controlled by primary color signals R, B and G. Accordingly, means are provided for deriving from the chroma signal a correction signal Y–M and for matrixing that correction signal with the luminance signal Y of the received program to develop a modified luminance signal M for combining with the modified color difference signals R–M, B–M and G–M in order to produce the three primary color signals. For the symmetrical three-phase demodulation embodiment under consideration, the means for deriving the correction signal comprises the common emitter impedance of matrix 25 and it is delivered by a connection 50 to M matrix 15.

The NTSC signal offers great flexibility of receiver design in that there is available a wide choice of demodulation angles from which a selection is made to derive those color signals that are best suited to the design approach. For the case at hand, three color difference signals $E_1$, $E_2$ and $E_3$ are developed in the demodulation system 21 which samples or demodulates the chroma signal at three-phase angles mutually displaced by 120° as determined by phase splitter 23. Here the expression "color difference signals" is used in the broad sense to define signals which vanish or sum to zero in the reproduction of white on the image screen. The phase angles and gains of the detectors will be made clear hereafter in a mathematical and vectorial development of the specifications of the color difference signals. These signals are delivered to matrixing network 25 where their common mode information is deleted, converting them into modified color difference signals for application to signal grids 19 of the picture tube. Concurrently, the luminance signal traversing the luminance channel is matrixed with a correction signal derived from network 25 to develop the modified luminance signal M for application to the cathodes of the three guns of the picture tube. The signals thus applied to the grids and cathodes of the electron guns are matrixed internally of the tube to the end that the several electron beams are modulated with primary color signals as required to synthesize an image in simulated natural color.

This philosophy of color image reproduction is distinctly different from the conventional approach employed heretofore in which the more familiar color difference signals R–Y, B–Y and G–Y are applied to the input grids of the picture tubes while the luminance signal Y is delivered to their cathodes. The end result is similar in that in each case primary color signals are obtained by internal matrixing within the picture tube. One unique advantage to applicant's different approach to color reproduction is a more nearly equal range of values of voltages applied to the three grids and, therefore, an equal demand on the several color difference signal generators. Indeed, with applicant's approach, the maximum excursions of the grid signals may be made essentially the same which in sharp contrast with the previous practice wherein the drive requirements of the grids are widely different from one another.

This philosophy of signal processing may be expressed mathematically and developed from well known specifications of the NTSC signal. For example, the following equations are well established:

$$Y = .1B + .3R + .6G \qquad (1)$$

$$R - Y = .7R - .1B - .6G \qquad (2)$$

$$B - Y = -.3R + .9B - .6G \qquad (3)$$

$$G - Y = -.3R - .1B + .4G \qquad (4)$$

Also, by definition the common mode information of the color difference signals of Equations 2–4 is M–Y where M is defined as follows:

$$M = \frac{R + G + B}{3} \qquad (5)$$

and, therefore:

$$M - Y = .03R + .23B - .26G \qquad (6)$$

Since matrix network 25 removes the common mode information from the first set of color difference signals, there is developed the following modified set of color difference signals:

$$R - M = .67R - .33B - .33G \qquad (7)$$

$$B - M = -.33R + .67B - .33G \qquad (8)$$

$$G - M = -.33R - .33B + .67G \qquad (9)$$

Of course, this set of signals is derived by subtracting Equation 6 from each equation of the set 2–4, inclusive. It is this set of modified color difference signals that are applied to the grids while the modified luminance signal M is applied to the cathodes of the three guns of the color tube.

The equalization of driving voltages on the signal grids attained by this approach may best be illustrated by considering extreme conditions. For example, the maximum excursion on the signal of the grid of the red gun occurs for the red field when the blue and green signals are zero. Equation 2 makes clear that the maximum excursion of the red grid signal derived with the conventional approach is $\pm.7$ whereas from Equation 7 the maximum excursion in the new approach is $\pm.67$. In similar fashion, it may be shown from Equations 3 and 8 that the maximum excursion of the signal on the grid of the blue gun is $\pm.9$ in the conventional system but $\pm.67$ in applicant's approach while for the signal applied to the grid of the green gun, the respective values are shown in Equations 4 and 9 to be $\pm.4$ and $\pm.67$. In short, applicant attains the same maximum excursions and, therefore, the same maximum demands of the signals on the grids of all three guns of the picture tube; whereas in the prior practice the green grid had an excursion of $\pm.4$ compared with the excursion of $\pm.9$ on the blue grid.

The Equations 1–4, being derived from the design theory underlying the NTSC signal, are predicated upon a normalizing chromaticity at illuminant C but in commercial practice this condition is not satisfied by the phosphors of the screen of the color picture tube. In accordance with commercial practice normal white is chosen near 9300° Kelvin instead of Illuminant C and, therefore, it has been suggested that a new set of colorimetric constants may be chosen more properly correlated to the new white coordinates. Without burdening this text with the development of the new coordinates, the results will be expressed in terms of the signals applied to the grids of the picture tubes as follows:

$$\text{red gun} = -.463B + 1.248R - 785G \qquad (10)$$

$$\text{blue gun} = 1.098B - .289R - 809G \qquad (11)$$

$$\text{green gun} = .007B - .322R + 315G \qquad (12)$$

The common mode information for this set of color difference signals is:

$$.214B + .212R - .426G \qquad (13)$$

From Equations 10–13, one may write an expression for another set of modified color control signals, modified by the elimination of common mode information. The modified set of signals are defined as follows:

$$\text{red gun} = -.677B + 1.036R - .359G \qquad (14)$$

$$\text{blue gun} = .884B - .501R - .383G \qquad (15)$$

$$\text{green gun} = -.207B - .534R + .741G \qquad (16)$$

For these drive signals on the grids of the picture tubes the maximum signal excursions are $\pm1.04$ for the red gun, $\pm.88$ for the blue gun, and $\pm.74$ for the green gun. While this is not the optimized condition of equal maximum excursions, it is nevertheless an improvement over the condition existing when the signals of Equations 2–4 are applied to the grids of the guns of the color tube.

Still further improvement may be realized if a common signal in accordance with expression (17), rather rather than in accordance with the expression (13), be substrated from each of the signals of Equations 10–12.

$$+.211B+.361R-.572G \quad (17)$$

Where the common signal of expression (17) is applicable, the set of modified color difference signals for application to the grids of the red, blue and green guns are as follows:

$$\text{red gun}=-.674B+.887R-.213G \quad (18)$$

$$\text{blue gun}=+.887B-.650R-.237G \quad (19)$$

$$\text{green gun}=-.204B-.683R+.887G \quad (20)$$

When the system functions in accordance with these signal definitions, the maximum demand is the same for each grid since all three grid signals have the same maximum excursion of ±.887.

Figure 2:
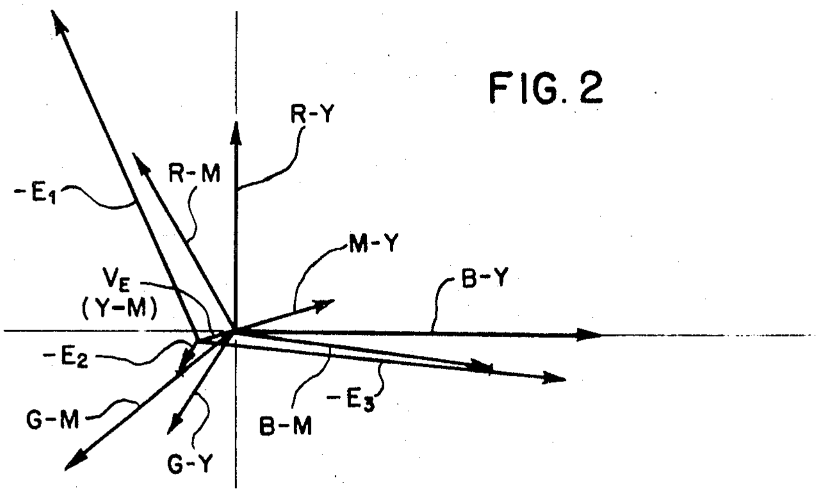
FIGURES 2 and 3 are vector diagrams utilized in explaining the operation of the receiver of FIGURE 1.

The philosophy of the color reproduction arrangement under consideration may also be represented vectorially as in FIGURE 2 in which the R–Y, B–Y, G–Y and M–Y vectors are plotted as to angle and amplitude from the specifications of the NTSC signal. The vectors R–M, B–M and G–M are, likewise, ascertainable from the signal specifications and they designate the three output signals derived from matrixing network 25 for application to the signal grids of the three guns in the color picture tube. Let $E_1$, $E_2$ and $E_3$ represent the input signals to the matrixing network obtained from demodulator 21 and $V_E$ the voltage across the common emitter impedance of that network.

In constructing the diagram of FIGURE 2, the vector $V_E$, which is proportional to the Y–M or common mode information to be eliminated in network 25 in deriving the output signals R–M, B–M and G–M, is directed along vector M–Y. While the angle of vector $V_E$ is important, its length is of no consequence since it merely denotes relative amplitude. Plotting three vectors at the end of vector $V_E$ remote from the origin with a mutual phase displacement of 120° permits one to determine the driving signals $E_1$, $E_2$ and $E_3$ to be supplied to matrix 25 from demodulator 21 in order to obtain the desired outputs. Specifically, the collector signals of transistors 26–28 are determined by the signals applied to the matrix less the voltage developed across the common emitter. It is more convenient, however, to plot $V_E$ and $-E_1$, $-E_2$, and $-E_3$. The orientation or phase may be measured by the angle of vector $-E_3$ relative to the B–Y axis and the gain is the scalar measure from the end of vector $V_E$ to the intersection with the B–M, R–M or G–M vector, as the case may be. There is some latitude of angular orientation of the vectors $-E_1$, $-E_2$ and $-E_3$ about vector $V_E$ but it is preferred to adopt the one in which vectors $-E_1$ and $-E_3$ are equal, that is to say, they intersect the vectors lines R–M and B–M at equal distances from the tip of the $V_E$ vector. This is a condition in which the detectors of demodulation system 21 supplying the $E_1$ and $E_3$ drive signals have equal gain and the gain of remaining detector is .127 times the gain of the other two. Of course, the detector gain is adjustable by modification of its circuit parameters, such as the load impedance. In the vector representation of FIGURE 2, vector $-E_3$ is 4.8° below the B–Y reference axis.

The parameters of matrixing network 25 must be correctly proportioned to derive the proper correcting signal $V_E$. If it be assumed that each of transistors 26–28 has the same value of load resistor 40–42, for the condition represented by the diagram of FIGURE 2 their individual emitter resistors are proportioned in accordance with the following:

$$\frac{R_{31}}{R_{30}}=0.193 \quad (21)$$

$$\frac{R_{32}}{R_{30}}=0.680 \quad (22)$$

Figure 3:
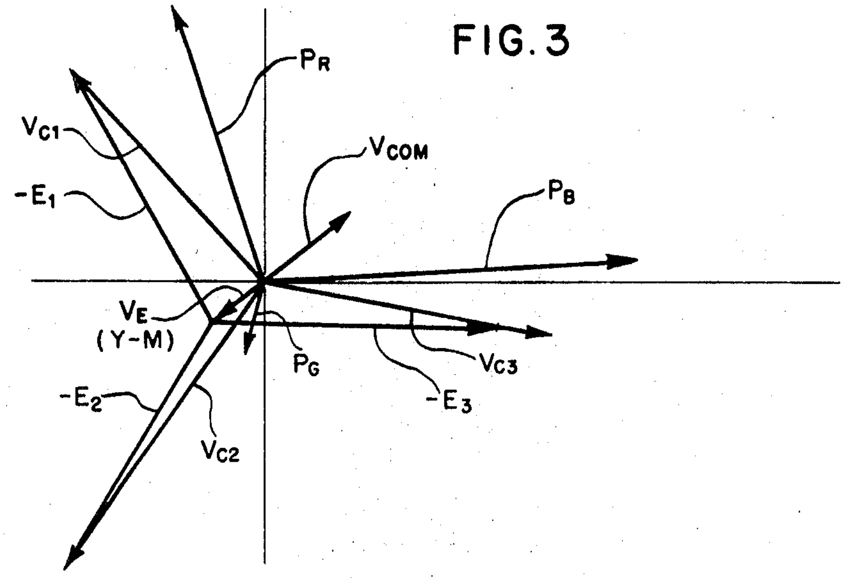

The vector diagram of FIGURE 3 is basically the same as that of FIGURE 2 differing therefrom in that the normalizing chromaticity, instead of being illuminant C, is 9300° Kelvin. The vectors $P_R$, $P_B$, and $P_G$ represent the signals of Equations 10–12; vector $V_E$ is the common mode information Equation 13; vectors $Vc_1$, $Vc_2$ and $Vc_3$ represent the signals of Equations 14–16; while vectors $-E_1$, $-E_2$ and $-E_3$ are the driving voltages delivered to the matrix network from the demodulation system 21 and plotted with negative polarity for convenience, as explained above.

The vector $-E_3$ is at an angle of $-0.77°$ relative to the B–Y reference axis and vectors $-E_1$, $-E_2$ and $-E_3$ are all equal in magnitude. In dealing with color signals normalized about 9300° K., the resistors 30, 31 and 32 of network 25 are proportioned in accordance with Equations 23 and 24:

$$\frac{R_{31}}{R_{30}}=1.83 \quad (23)$$

$$\frac{R_{32}}{R_{30}}=0.856 \quad (24)$$

Figure 4:
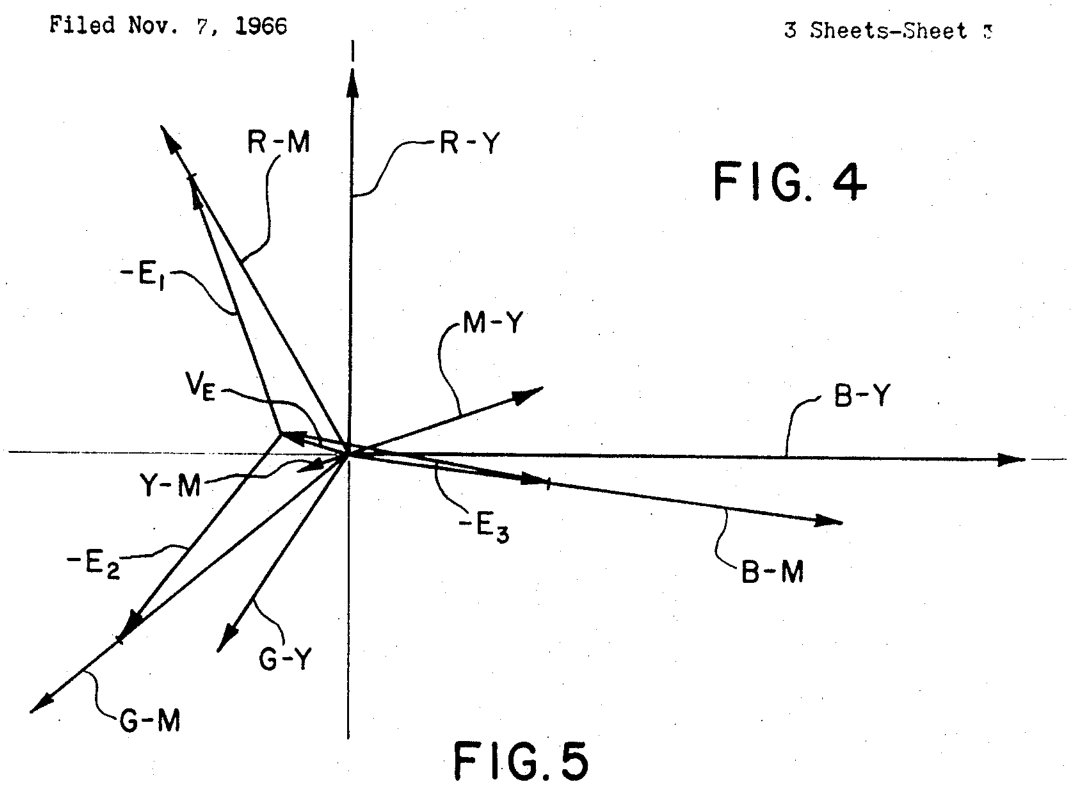
Figure 5:
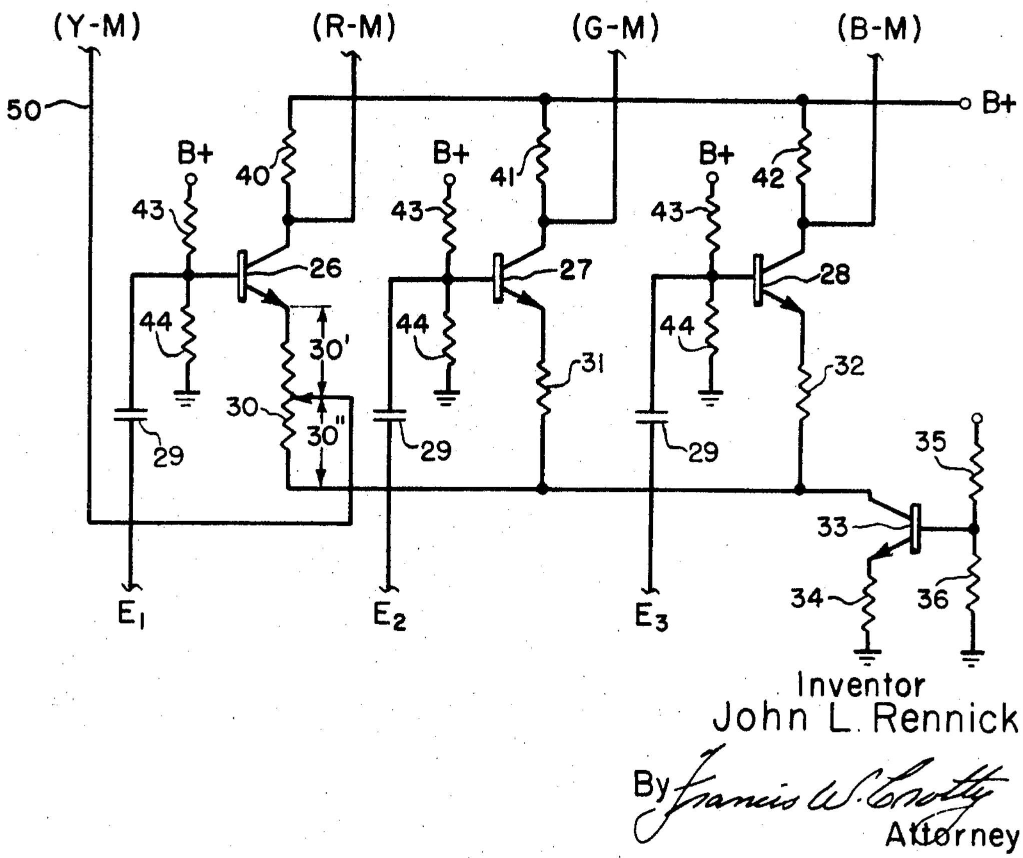

It is convenient to have the three inputs to matrix 25 of equal intensity as just described and this may also be accomplished with a system predicated upon a normalizing chromaticity at illuminant C. The applicable vector diagram for such a condition is that of FIGURE 4 and the arrangement of network 25 is modified as indicated in FIGURE 5. For this embodiment, the parameters are proportioned as follows:

$$\frac{R_{31}}{R_{30}}=0.894 \quad (25)$$

$$\frac{R_{32}}{R_{30}}=0.480 \quad (26)$$

$$R_{30'}=0.88\ R_{30} \quad (27)$$

$$R_{30''}=0.12\ R_{30} \quad (28)$$

and $-E_3$ is 9.3° below reference vector B–Y.

Figure 7:
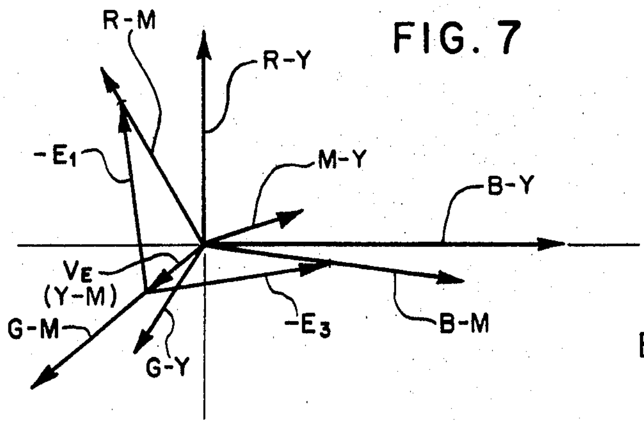
FIGURES 4 and 7 are vector diagrams for different modifications of the invention.

The modification of FIGURE 6 employs a two phase, as distinguished from a three phase, demodulator driving matrix network 25. Accordingly, there are only two input voltages $E_1$ and $E_3$ to the matrix. The vector diagram of FIGURE 7 illustrates the operation of this modification. This diagram is predicated on the assumption that the normalizing chromaticity is illuminant C and is, therefore, a plot of the R–Y, B–Y and G–Y signals. Since the voltage across the common emitter impedance $V_E$ is the only voltage applied to transistor 27, supplying the grid signal to the green electron gun, it is directed along the G–M vector. Quadrature vectors $-E_1$ and $-E_3$ constructed at the end of vector $V_E$ show the driving input signals. Their magnitude is determined by their intersection with vectors R–M and B–M, respectively, and preferably they are of equal amplitude. Vector $-E_3$ is at an angle of 8.71° with the B–Y axis. In this embodiment, the correcting signal for application to matrix 15 in the luminance channel is taken from a tap of emitter resistor 32. The network in this embodiment again has equal output load resistors and the individual emitter resistors are proportioned in accordance with the following:

$$\frac{R_{31}}{R_{30}}=0.398 \quad (29)$$

$$\frac{R_{32}}{R_{30}}=0.604 \quad (30)$$

Potentiometer 32 is adjusted as follows:

$$R_{32'}=0.581\ R_{32} \quad (31)$$

$$R_{32''}=0.419\ R_{32} \quad (32)$$

The described embodiments of the invention are attractive both with respect to the nature of the signals applied to the grids of the three guns in a color tube and with respect to their adaptability to integrated circuitry. It has been explained that applicant's approach permits the grid signals to be more nearly equal in their amplitude excursions and, in the preferred modes of operation, they may have precisely the same maximum excursions so that the same demands are imposed on the circuitry for supplying these signals to the picture tube grids. Additonally, the matrix network 25 is composed of similar transistors with preferably identical collector loads and identical biasing networks, being individualized only as to their emitter impedances. Since the circuits of the three amplifiers in the matrix are so nearly alike to one another, they lend themselves much more readily to the fabricating techniques of integrated circuits than otherwise whether one adopts the monolithic, thin film or thick film approach.

The three phase arrangement is believed to be the more attractive of those illustrated and the circuit configuration of demodulation system 21 may be basically the same as that of matrix network 25, having a similar arrangement of three transistors functioning as detectors and a fourth for signal injection. When the demodulator is of this construction, the demodulation signals from phase splitter 23 are applied to an assigned one of the base electrodes while the chroma signal is fed to the base electrode of the fourth transistor and is injected into the detector circuits by the coupling afforded by this transistor serving as a common emitter impedance for the three detectors. Color difference signals resulting from the detection may be derived at the several collector loads of the transistor detectors for application to matrix network 25 and the gain is readily adjusted by varying the load resistors of the detectors. Again, if the transistor circuitry of the three detectors is made as similar to one another as practicable, the three phase symmetrical demodulator becomes suited for integrated circuitry and may well be constructed along with matrix 25.

It is further apparent that the described arrangements minimize criticality of adjustments. In particular, the three phase embodiments utilize demodulation signals that are symmetrical, having a relative phase displacement of 120°, whereas in the alternative embodiment the demodulation signals are in phase quadrature. These are relatively simple phase angles to attain and may be derived from circuitry that requires no critical adjustment. Having attained the demodulation signals with appropriate relative phase, a phase shifting network may be included in phase splitter 23 to control the detection angles.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. Color television receiving apparatus for processing a luminance signal representing brightness information of an image and a chrominance signal in the form of a subcarrier phase and amplitude modulated with hue and saturation information of that image, respectively, said apparatus comprising:

a symmetrical three-phase detection system having three synchronous detectors with individual output load impedances;

means for applying said chrominance signal to each of said three detectors;

means for applying to each of said detectors an assigned one of three demodulation signals, phase synchronized to said chrominance signal but having a mutual phase displacement of 120°, to detect three color difference signals;

a matrixing network including three amplifiers having input circuits coupled to said detector load impedances, respectively, and having output circuits including an impedance common to the output circuits of all three amplifiers but also having individual output load impedances for developing three modified color difference signals which correspond to said three color difference signals free of their common mode components;

and means for deriving from said chrominance signal a correction signal and for matrixing said correction signal with said luminance signal to develop a modified luminance signal for combining with said modified color difference signals to produce three primary color signals.

2. Color television receiving apparatus in accordance with claim 1 in which the amplifiers of said matrixing network are transistors having a common emitter impedance and in which said output load impedances are collector impedances of said transistors.

3. Color television receiving apparatus for processing a luminance signal representing brightness information of an image and a chrominance signal in the form of a subcarrier phase and amplitude modulated with hue and saturation information of that image, respectively, said apparatus comprising:

a demodulation system having at least two synchronous detectors with individual output load impedances;

means for applying said chrominance signal to each detector of said demodulation system;

means for additionally applying to each of said detectors demodulation signals, phase synchronized to said chrominance signal and having a preselected mutual phase relation to derive in said demodulation system at least two color difference signals having common mode components;

a matrixing network including three amplifiers at least two of which have input circuits coupled to said detector load impedances, respectively, and having output circuits including an impedance common to the output circuits of all three amplifiers but also having individual output load impedances for developing three modified color difference signals two of which correspond to said three color difference signals free of their common mode components;

and means for deriving from said chrominance signal a correction signal and for matrixing said correction signal with said luminance signal to develop a modified luminance signal for combining with said modified color difference signals to produce three primary color signals.

4. Color television receiving apparatus in accordance with claim 3 in which each of said three modified color difference signals has the same maximum amplitude excursion.

5. A color television receiving apparatus in accordance with claim 3 in which said correction signal corresponds to said luminance signal minus said common mode components.

6. Color television receiving apparatus in accordance with claim 1 in which said means for deriving said correction signal comprises said common impedance of said matrix network.

7. A color receiving apparatus in accordance with claim 2 in which at least two of said modified color difference signals have substantially equal amplitude excursions.

8. Color television receiving apparatus in accordance with claim 2 in which said transistor amplifiers of said matrix network have equal collector loads and individual emitter loads as well as a common emitter impedance.

9. A color television receiving apparatus in accordance with claim 5 including a three-gun color picture tube and means for applying said modified luminance signal and said modified color difference signals to said picture tube.

10. Color television apparatus in accordance with claim 3 in which said demodulation system has only two detectors, in which two demodulation signals in phase quadrature are applied to said detectors to develop said color difference signals and in which one amplifier of said matrix network has an input electrode maintained at a fixed reference potential.

11. Color television receiving apparatus in accordance with claim 10 in which said matrix amplifiers are of the transistorized type having individual emitter impedances plus a common emitter impedance and in which said correcting signal is derived from said common emitter impedance and from at least one of said individual emitter impedances.

References Cited

UNITED STATES PATENTS

| | | | |
|---|---|---|---|
| 2,868,872 | 1/1959 | Espenlaub | 178—5.4 |
| 2,927,957 | 3/1960 | Torre | 178—5.4 |
| 3,333,059 | 7/1967 | Davidse | 178—5.4 |

RICHARD MURRAY, Primary Examiner

J. MARTIN, Assistant Examiner